(12) United States Patent
Foley

(10) Patent No.: US 6,487,302 B2
(45) Date of Patent: *Nov. 26, 2002

(54) METHOD FOR READING AND SORTING DOCUMENTS

(75) Inventor: James E. Foley, Easton, CT (US)

(73) Assignee: Agissar Corporation, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/058,667

(22) Filed: Jan. 28, 2002

(65) Prior Publication Data

US 2002/0067846 A1 Jun. 6, 2002

Related U.S. Application Data

(63) Continuation of application No. 09/229,815, filed on Jan. 13, 1999, now Pat. No. 6,381,342.

(51) Int. Cl.$^7$ .................................................. G06K 9/00
(52) U.S. Cl. ....................... 382/102; 209/584; 209/900; 705/401
(58) Field of Search ........................ 382/101; 209/584, 209/900; 705/401

(56) References Cited

U.S. PATENT DOCUMENTS

| | | |
|---|---|---|
| 3,266,626 A | 8/1966 | Simjian |
| 3,295,139 A | 12/1966 | Simjian |
| 3,538,338 A | 11/1970 | Rabinow |
| 3,791,516 A | 2/1974 | Tramposch |
| 3,904,516 A | 9/1975 | Chiba et al. |
| 4,013,999 A | 3/1977 | Erwin et al. |
| 4,205,780 A | 6/1980 | Burns et al. |
| 4,326,636 A | 4/1982 | Kawakami |
| 4,542,829 A | 9/1985 | Emery et al. |
| RE32,328 E | 1/1987 | Russell |
| 4,741,047 A | 4/1988 | Sharpe, II |

(List continued on next page.)

FOREIGN PATENT DOCUMENTS

| | | |
|---|---|---|
| DE | 258895 | 10/1912 |
| DE | 3821106 | 1/1989 |
| EP | 36149 | 9/1981 |
| EP | 215469 | 3/1987 |
| EP | 440129 | 8/1991 |
| EP | 447581 | 9/1991 |
| JP | 54-01100 | 1/1979 |
| JP | 1-209247 | 8/1989 |
| JP | 63-319180 | 12/1998 |

OTHER PUBLICATIONS

Electronic Industries, Jul. 1958, pp. 56–60.
Toshiba Review No. 118, Nov.–Dec. 1978, pp. 5–10.

*Primary Examiner*—Leo Boudreau
*Assistant Examiner*—Barry Choobin
(74) *Attorney, Agent, or Firm*—St. Onge Steward Johnston & Reens LLC

(57) ABSTRACT

A method for reading and sorting documents is provided which generally comprises staging each document for processing, capturing a digital image of the front side and the back side of each document, determining the physical orientation of each document using digital orientation recognition software and possibly hardware, reading the information from a digital image of each document, sorting the documents by orientation, and then communicating the information read from each document to a posting system. Additionally, the image of the document can be automatically oriented and then read. The documents, among other things, can include checks and coupons. When the document is a bank check, the method further comprises endorsing the check, printing an audit trail for the check, sorting the check by orientation, preparing a cash letter and sending the check to the bank.

23 Claims, 3 Drawing Sheets

U.S. PATENT DOCUMENTS

| | | |
|---|---|---|
| 4,863,037 A | 9/1989 | Stevens et al. |
| 4,934,892 A | 6/1990 | Smith et al. |
| 4,993,556 A | 2/1991 | Gerlier |
| 4,993,700 A | 2/1991 | Winkler |
| 5,020,110 A | 5/1991 | Chominski |
| 5,025,475 A | 6/1991 | Okabe |
| 5,036,190 A | 7/1991 | Lile et al. |
| 5,052,168 A | 10/1991 | DeWitt et al. |
| 5,054,620 A | 10/1991 | DeWitt et al. |
| 5,115,918 A | 5/1992 | DeWitt et al. |
| 5,240,116 A | 8/1993 | Stevens et al. |
| 5,277,321 A | 1/1994 | Nagasawa et al. |
| 5,293,431 A | 3/1994 | Hayduchok et al. |
| 5,295,196 A | 3/1994 | Raterman et al. |
| 5,310,062 A | 5/1994 | Stevens et al. |
| 5,386,482 A | 1/1995 | Basso et al. |
| 5,397,003 A | 3/1995 | Stevens et al. |
| 5,439,118 A | 8/1995 | York |
| 5,441,159 A | 8/1995 | DeWitt et al. |
| 5,444,794 A | 8/1995 | Uhland, Sr. |
| 5,460,273 A | 10/1995 | Stevens et al. |
| 5,464,099 A | 11/1995 | Stevens et al. |
| 5,467,406 A | 11/1995 | Graves et al. |
| 5,506,691 A | 4/1996 | Bednar et al. |
| 5,518,121 A | 5/1996 | Stevens et al. |
| 5,540,338 A | 7/1996 | Stevens et al. |
| 5,558,232 A | 9/1996 | Stevens et al. |
| 5,649,026 A | 7/1997 | Heins, III |
| 5,649,628 A | 7/1997 | Stevens et al. |
| 6,381,342 B2 * | 4/2002 | Foley ........................ 209/584 |

* cited by examiner

METHOD FOR READING AND SORTING DOCUMENTS

PRIORITY APPLICATION

This Application is a Continuation Application of U.S. patent application Ser. No. 09/229,815 filed Jan. 13, 1999 now U.S. Pat. No. 6,381,342.

FIELD OF THE INVENTION

The invention relates to a method of sorting and reading documents, and more specifically to using a captured digital image and codeline data of the document to determine orientation and sort the document according to its orientation.

FIELD OF THE INVENTION

Frequently, when a document has to be read, either manually or by machine, the document must first be given a proper orientation. For instance, when a check is received in a mailed envelope, the check may have one of four orientations within the envelope—if not properly oriented, it can be upside down, backwards, or both. Thus, documents must typically be sorted according to orientation before they are read. First, the orientation of the each document must be determined. Then each document will be reoriented to a desired orientation, if necessary, such that it can be read. Orienting each document may include sorting each document according to its orientation. The process of having to orient the document before reading it can make the associated machinery more expensive to produce and maintain.

The Opex 150, a sorter from the Opex Corporation, operates using the above process. The machinery opens an envelope, removes one or more documents from the envelope, determines its orientation, and then routes the document according to its orientation. The document can then be read.

Japanese Patent No. 1-209247 to Nakano discloses an automatic sorter for mail. Using a video camera, the device scans a letter to determine which orientation the letter has. Based upon this determination, the sorter first sorts the letters into four possible orientations and then routes the different orientations such that the letters end up in the same orientation. The letters are then read. The disadvantage with the Opex 150 and Nakano apparatus is that documents must be physically reoriented before they can be read, which makes the apparatus more complex and difficult to maintain.

U.S. Pat. No. 5,293,431 to Hayduchok et al. discloses a system for orienting documents in the automated processing of bulk mail and the like. The system acquires a digital image of both sides of a document. From these images, the system determines the orientation of the document by analyzing the pixels of the image at preselected areas of the document. The document is then reoriented for further processing if necessary. As with the above system, the disadvantage to this system is that the document must be physically reoriented before it can be read.

U.S. Pat. No. 5,293,431 to Stevens et al. discloses a method for automated mail extraction and remittance processing. The disclosed method involves presenting to an operator only the documents of windowed envelopes in which the checks are oriented in the same manner as the coupon, while removing the other documents from the processing path. Disadvantageously, this method only can be used for windowed envelopes. Furthermore, the method involves only manually reading the documents and sorting the documents according to their orientation before reading them.

What is desired, therefore, is a method of processing a document, which can include either a check or a coupon, in which the actual document does not have to be manually or machine reoriented before the information on the document is read.

SUMMARY OF THE INVENTION

Accordingly, an object of the present method is to provide a method of reading and sorting documents according to each document's orientation in which the documents do not need to be reoriented before they can be processed on a document transport.

It is another object of the invention to provide a method of the above type in which documents can be read in all four possible orientations.

It is yet another object of the invention to provide a method of the above type in which both checks and coupons can be read and later sorted by orientation.

These objects of the invention are achieved by a method for reading and sorting documents, which generally comprises staging each document for processing, capturing a digital image of the front side and the back side of each document, determining the physical orientation of each document using digital orientation recognition software, reading the information from each document, sorting the documents by orientation, and then communicating the information read from each document to a posting system. Optionally, the image of the document can be automatically oriented and then read. The documents, among other things, can include checks and coupons. When the document is a bank check, the method further comprises sorting the check by orientation, encoding the check, endorsing the check, printing an audit trail for the check, preparing a cash letter and sending the check to the bank.

DETAILED DESCRIPTION OF THE INVENTION

Figure 1:
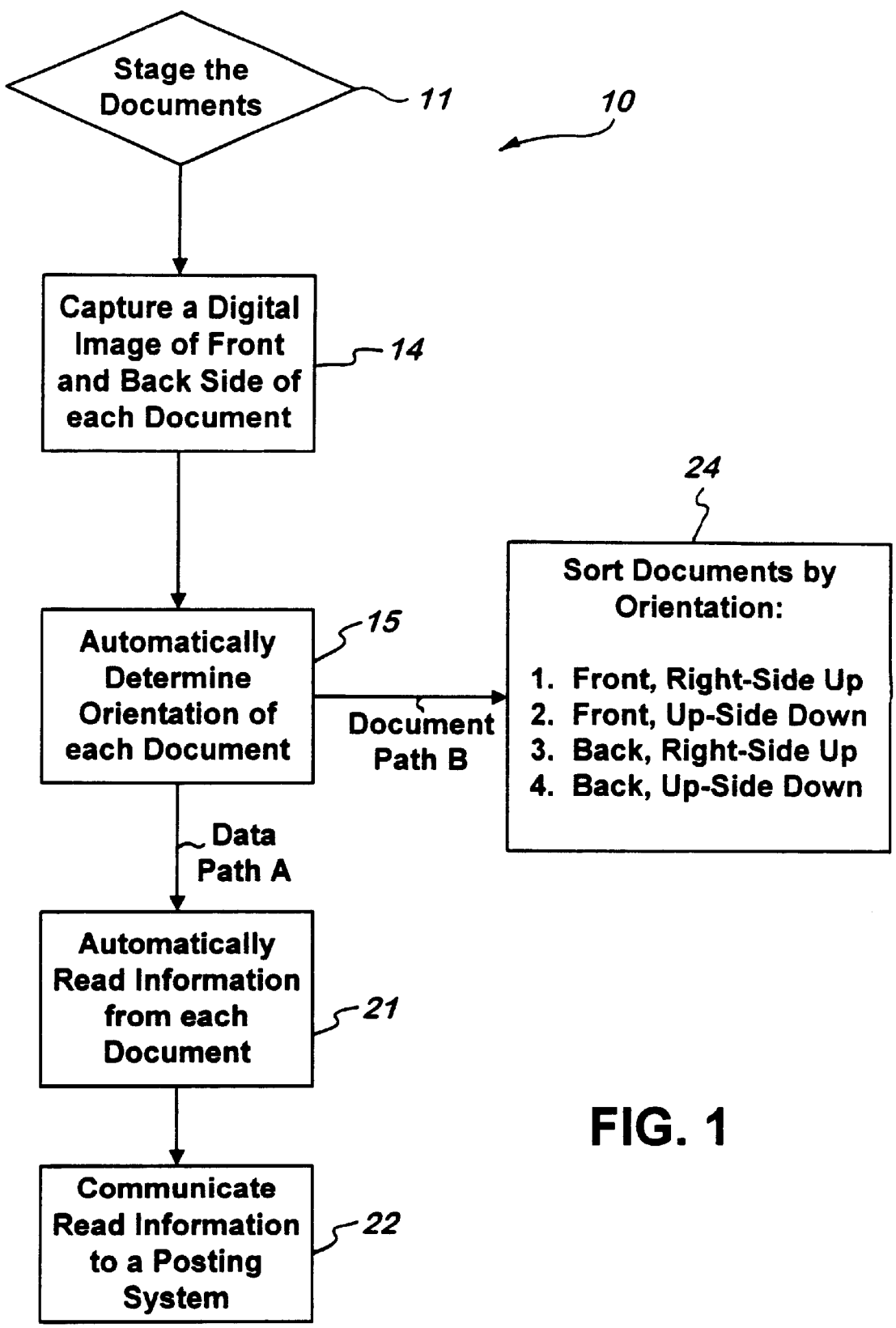
FIG. 1 is a flowchart for the method of reading and sorting documents in accordance with the present invention.
Figure 2:
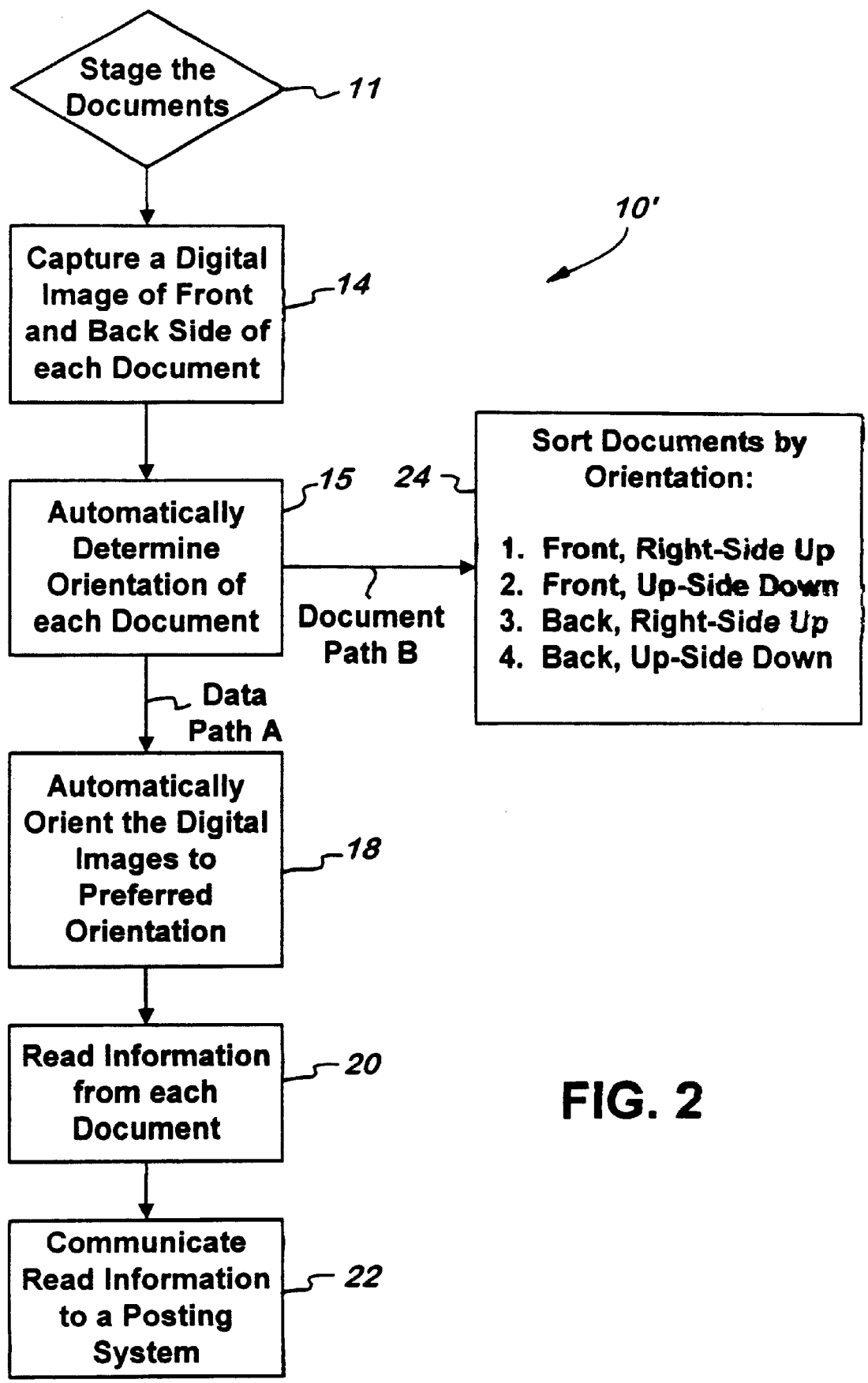
FIG. 2 is a flowchart for the second embodiment of the method of FIG. 1.
Figure 3:
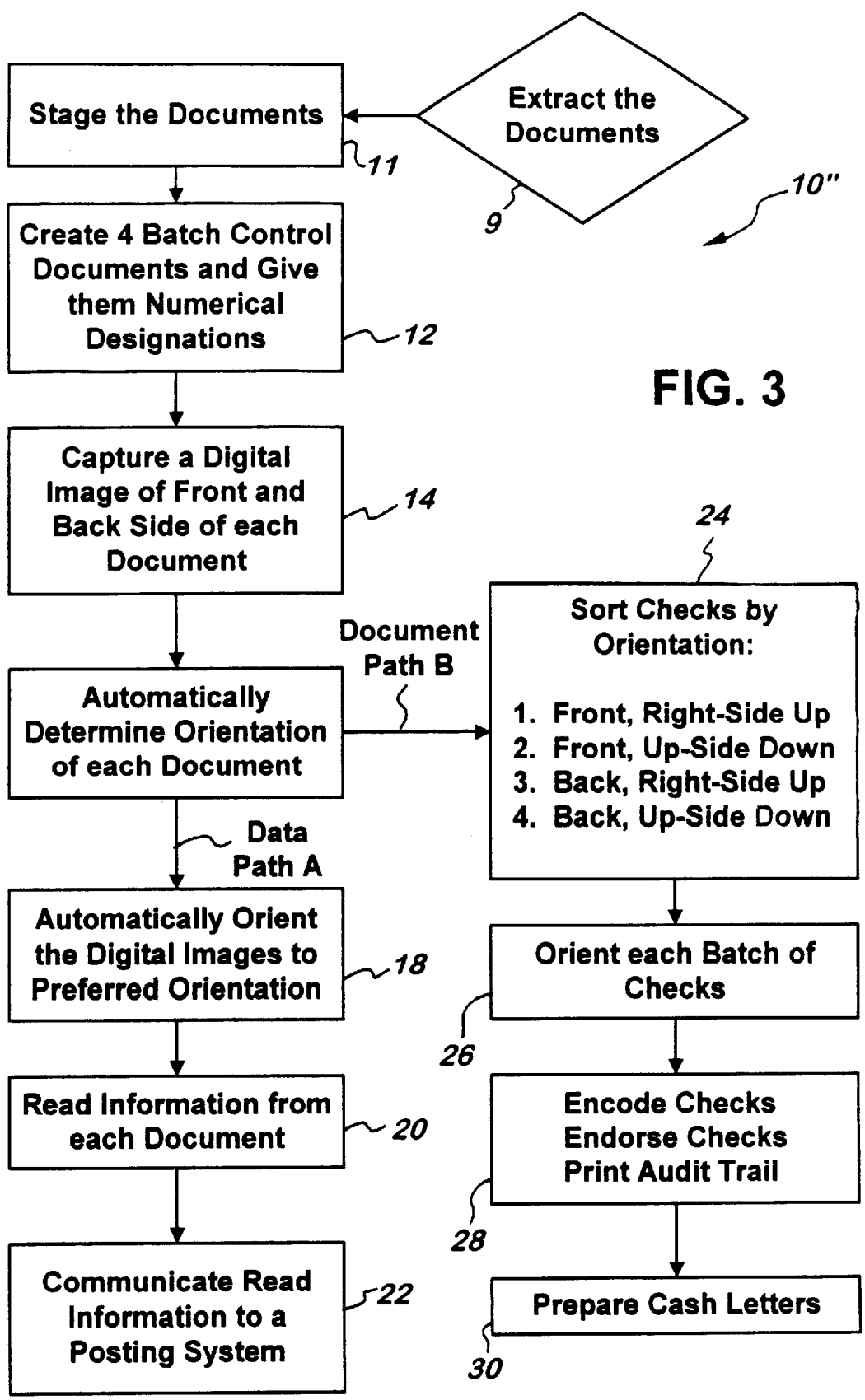
FIG. 3 is a flowchart for the third embodiment of the method of FIG. 1, wherein the documents include checks and coupons.

The methods for reading and sorting documents 10, 10', 10" such as checks and coupons in accordance with the invention are shown in FIGS. 1–3. These methods may be used on a wide variety of documents such as checks, coupons, statements, bank notes and other writings having an orientation that is preferred.

First, if the documents are in an envelope, the documents will have to be extracted (9) from the envelope. The mail extraction process may begin with receiving the incoming envelopes and opening them, either automatically or manually. The envelopes that contain the documents may come from the United States Postal Service or some other source. Next, the envelopes can be sorted using automated equipment. The desired sorting preferences may take into account the thickness of the envelope contents, the presence of staples or paper clips, whether or not a check or coupon is folded, and the size and type of the envelope. The orientation of the envelopes is an optional sorting preference at this point of the process.

Opening the envelopes and extracting the documents (9) can be performed manually or it can be performed automatically. Preferably, larger operations will want to use some type of automated equipment, such as the Aggisar automatic contents extractor model ACE. Smaller operations may prefer to do this task manually. Reorienting the documents is unnecessary at this point of the process.

The documents then have to be staged for processing (11) on a transport. Following the staging of the documents on a transport, the system captures a digital image of the front and back of each document (14) using a digital camera or other mechanisms for capturing the image. The system then uses software to automatically determine (15) the physical orientation of the document. The system may further or otherwise use hardware-based codeline reading devices, such as OCR and MICR, to assist in automatically determining the physical orientation of each document. When processing checks and attendant coupons, the orientation of each coupon and check is determined based upon the orientation of each coupon's optical character scanline and each check's magnetic ink character codeline.

After determining the orientation of the captured images of the documents, the system undertakes two separate operations. The first operation (Path A) involves the processing of data captured from the document, while the second operation (Path B) involves the physical handling of the document. In the first operation (Path A), the system reads (20) and communicates (22) the information found on the documents. In the case of checks and coupons, typical information read is the customer account, the checking account number, the amount of the check, the date and a wide variety of other information. In the second operation (Path B), the method sorts the documents (24). For the second embodiment of the invention (See FIG. 2), the method for the first operation (Path A) further automatically orients the digital image of the document before the document is read. For the third embodiment of the invention (See FIG. 3), the method for the second operation (Path B) further properly orients the checks (26), encodes, endorses and prints an audit trail for them (28) and readies them for sending to a bank (30).

Referring again to FIG. 1, for the first operation (Path A) the system automatically reads (21) the information from the image of the document, regardless of what orientation the document has, which can be either front and up-side down, front and right-side up, back and up-side down, back and right-side up. The system automatically reads the document (21) by either using optical character recognition (OCR) to read an optical character scanline or a magnetic ink codeline or can use magnetic image character recognition (MICR) to read the magnetic ink codeline. Alternatively, the system can use software based digital image reading programs to read the document. It should be noted that if the information is automatically read, the documents may not have to be automatically oriented. Any document that the system can not read is rejected and either sent through the system again or sent to an image keyer for manual data entry. If the system does not have the capability to read all of the required document information, such as an amount, an account number field or individual characters within the required field or fields, an image of the information is sent to an operator, also called an image keyer, for manual data entry.

For checks, the system can use MICR and/or OCR to automatically read each check's magnetic ink codeline. Typically, MICR can read about 98% or more of the documents correctly on the first pass if the document is properly oriented. In some systems, the checks' amount field, called the courtesy amount, is read from a digital image of the check using courtesy amount recognition (CAR) and image character recognition (ICR). Legal Amount Recognition (LAR) can also be used to digitally read the legal amount line on a check. In other systems without image-based automatic amount recognition, images are presented to human keyers for data entry.

If an image of a document is automatically oriented, as shown in FIG. 2, the image can then be read (20) manually or automatically. If the image is to be manually read, the image is displayed to an image keyer who reads each document and enters the required information from the document. The image keyer may also enter the data for any document that was previously rejected from the process. To assist the image keyer, the image of the document is oriented and shown on a readable display, such as a computer monitor. For checks, the image keyer can enter the courtesy amount after viewing the image of the courtesy amount field if necessary. The image keyer can then reconcile all transactions that are out of balance following the manual verification and takes care of transactions requiring special handling.

To finish the first operation, the image keyer transmits the data to a posting system (22). The posting system can be a host system to which the collected data is transferred for further processing. Many systems retain the data in storage and transmit the data to a posting system at a later time. Thus, the data need not be sent to a posting system before the documents are physically sorted.

For the second operation (Path B), the system first sorts the documents (24) at transport speed to one of four pockets based upon the orientation of the document: face forward and right-side up, face forward and up-side down, back forward and right-side up, or back forward and up-side down. When the documents include checks and coupons (See FIG. 3), the coupons, regardless of orientation, are preferably sorted (24) into a pocket separate from the checks. Sorting the checks from the coupons, however, may possibly be done at a later time.

Referring to FIG. 2, the method for reading and sorting documents 10', can further include automatically orienting the captured digital images of each document (18) based upon its previously determined orientation. The digital images of each document can be stored in a properly oriented form. Alternatively, the data record for each image could store one or two flags that indicate the orientation of each document. Upon display of the documents' images, each document can be automatically flipped or rotated to the proper orientation. Once properly oriented, the information is then read (20) from the document. The information can then either be read automatically as discussed above, or can be read manually by an operator on a computer monitor.

Referring to FIG. 3, the present method for reading and sorting documents 10" can be used for the processing for checks and coupons that are sent in the same envelope. For the processing of checks, the next step after staging the documents (11) includes preparing the documents for image-based transport capture which includes creating control documents, such as batch headers and batch trailers (12). The control documents are added to the transactions that were previously extracted from the envelopes. With some previous methods, only one batch header and one batch trailer were required for each batch. With the present method, additional batch headers and batch trailers may be required for each batch. Batch trailers, however, may not be necessary. Because each batch of checks will be later sorted into four different pockets based upon check orientation, four batch headers and four batch trailers are required for each batch. As with previous methods, the batch header has a unique batch number. It is desirable, however, that this unique number be printed in at least four locations on the batch header such that it can be machine read in all four possible orientations.

Still referring to FIG. 3, for the second operation (Path B) after the system determines the orientation of each document, the system separates the checks from the coupons and then sorts the checks. The system sorts the checks (24) at transport speed to one of four pockets based upon the orientation of the check: face forward and right-side up, face forward and up-side down, back forward and right-side up, or back forward and upside down. The coupons, regardless of orientation, are preferably sorted into a pocket separate from the checks (24).

The checks are physically oriented by an operator before the encode pass. The step of physically orienting the checks (26) will be different depending on whether or not the batch headers and batch trailers are unique and readable in all four possible orientations, or whether or not a batch trailer exists. Depending on their orientation, an operator manually takes the checks and orients them along with the batch header and the trailer, if one exists, such that the batch documents can be read when the checks are in the proper orientation. Following this processing, the batch headers and batch trailers may be sorted and reused at another time.

Next, the system can transport each pocket of checks through the encode pass (28). The system encodes the correct dollar amount on the checks, endorses them, and prints an audit trail for the checks (28). Some systems may perform the steps of encoding, endorsing and audit trail printing in different orders. Audit trails may also be printed on other documents such as the latch or control documents.

After the encode pass, the checks will have been encoded and properly oriented. For a non-bank operation or a bank with a check processing operation in a different location cash letters are prepared and the encoded checks are sent to the appropriate bank or banks (30). For banks with remittance/lockbox processing operations physically close to the check processing operation, cash letters are not prepared. Rather, the remittance/lockbox operation forward the checks to the check processing operation where cash letters are subsequently prepared. A key capability is to process checks through the encode pass in reverse order for back forward and right-side up, and back forward and up-side down checks. Additionally and optionally, a key capability is to process checks through the encode pass in any order within the batch.

The methods for reading and sorting documents 10, 10', 10" herein relate to documents, not only checks. Therefore the method need not include the steps specific to checks, such as the part of the second operation (Path B) shown only in FIG. 3, which includes physically sorting (24), orienting (26), processing (28) and sending the checks to a bank (30).

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A method for sorting and reading a batch of documents of the type including information and having a front side and a back side, the method being for the purposes of communicating such information to a posting system, comprising the steps of:

staging each document for processing;

capturing a digital image of the front side and the back side of each document;

automatically determining the physical orientation of each document;

reading the information from a digital image of each document;

sorting each document by orientation; and communicating the information read from each document to the posting system.

2. The method of claim 1, further comprising the step of automatically orienting the digital image of each document to the preferred orientation after determining the orientation of each document.

3. The method of claim 1, wherein the information includes machine readable information and the step of reading the information is done automatically.

4. The method of claim 3, wherein the document is a check and the machine readable information includes a magnetic ink codeline and a courtesy amount and wherein the step of automatically reading the machine readable information comprises automatically reading the magnetic ink codeline by magnetic ink character recognition and automatically reading the courtesy amount by digital image-based character recognition.

5. The method of claim 3, wherein the document is a check and the machine readable information includes a magnetic ink codeline and a courtesy amount and the step of automatically reading the machine readable information comprises:

automatically reading the magnetic ink codeline by optical character recognition; and automatically reading the courtesy amount by image character recognition.

6. The method of claim 3, wherein the document is a check and the machine readable information includes a magnetic ink codeline and the non-machine readable information includes a courtesy amount and wherein the step of reading the information comprises:

automatically reading the magnetic ink codeline by magnetic ink character recognition; and manually reading the courtesy amount.

7. The method of claim 3, wherein the document is a coupon, and wherein the machine readable information includes an optical character scanline, and the step of automatically reading the information comprises automatically reading the optical character scanline by optical character recognition.

8. The method of claim 3, wherein the document is a check, the check has a right-side up orientation and an up-side down orientation, and wherein the method further comprises the steps of:

providing a batch header and a batch trailer for each of the sets of documents having a different orientation, the batch header having a unique numerical designation; and after determining the physical orientation of each document, sorting the check based upon its orientation into a plurality of sets selected from the group consisting of the front side and the right-side up, the front side and the up-side down, the back side and the right-side up, and the back side and the up-side down.

9. The method of claim 8, further comprising:

orienting each check to the preferred orientation;

encoding each check;

endorsing each check;

printing an audit trail for each check;

preparing a cash letter; and sending each check to a bank.

10. The method of claim 8, further comprising extracting each check from an envelope before staging the check.

11. A method for sorting and reading a batch of documents of the type having a front side, a back side, a right-side up, an up-side down, and a preferred orientation, comprising the steps of:

staging each document for processing;

capturing a digital image of the front side and the back side of each document;

automatically determining the physical orientation of each document;

reading the oriented digital image of each document; and sorting each check based upon its orientation into a plurality of sets selected from the group consisting of the front side and the right-side up, the front side and the up-side down, the back side and the right-side up, and the back side and the up-side down.

12. The method of claim 11, further comprising the step of automatically orienting the digital image of each document from a position selected from the group comprising face-forward and right-side up, face-forward and up-side-down, face-backward and right-side-up and face-backward and up-side-down to a preferred orientation.

13. The method of claim 11, further comprising the step of providing at least four batch headers, wherein each of the batch headers has a unique numerical designation printed on at least four separate locations.

14. The method of claim 13, further comprising the step of providing at least four batch trailers.

15. The method of claim 11, further comprising extracting each document from an envelope before staging each document.

16. The method of claim 11, wherein the orientation of each document is determined automatically by using software.

17. The method of claim 11, wherein the orientation of each document is determined automatically by using a hardware-based codeline device.

18. A method for sorting and reading a batch of checks of the type having a front side, a back side, a right-side up, an up-side down and a preferred orientation and including readable information, the method being for the purposes of communicating such information to a posting system, comprising the steps of:

staging each of the checks for processing;

creating at least four batch control documents;

printing a unique numerical designation on each of the batch control documents;

capturing a digital image of the front side and the back side for each check;

determining the physical orientation of each check using digital software;

reading the digital image of each check;

sorting each of the checks based upon its orientation into one of four sets selected from the group consisting of the front side and the right-side up, the front side and the up-side down, the back side and the right-side up, and the back side and the up-side down; and communicating the information read to the posting system.

19. The method of claim 18, wherein the step of creating at least four batch control documents comprises creating four batch headers and wherein a unique numerical designation is printed on at least four separate locations of each batch header.

20. The method of claim 18, wherein the step of creating at least four batch control documents comprises creating four batch headers and four batch trailers and wherein a same unique numerical designation is printed on at least four separate locations of each batch header.

21. The method of claim 18, further comprising after sorting each of the checks based upon its orientation, the steps of:

orienting each check to the preferred orientation;

encoding each check;

endorsing each check;

printing an audit trail for each check;

preparing a cash letter; and sending each check to a bank.

22. The method of claim 18, further comprising extracting each check from an envelope before staging the check.

23. The method of claim 18, further comprising the step of automatically orienting the digital image of each document from a position selected from the group comprising face-forward and right-side-up, face-forward and up-side-down, face-backward and right-side-up and face-backward and up-side-down to a preferred orientation.

* * * * *